June 17, 1952  D. HALE ET AL  2,600,532
METHOD FOR MANUFACTURE OF CEREAL FOOD PRODUCTS
Filed July 27, 1949  5 Sheets-Sheet 1

FIG. I.

Douglas Hale,
Ellsworth J. Carpenter,
Inventors,
Haynes and Koenig,
Attorneys.

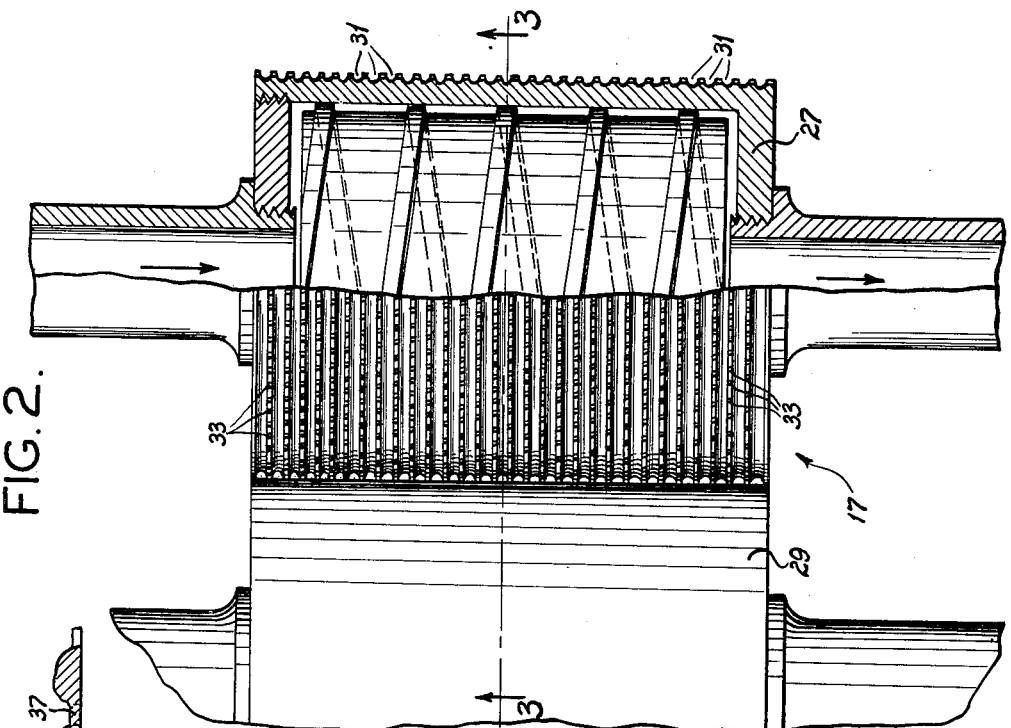
FIG. 2.
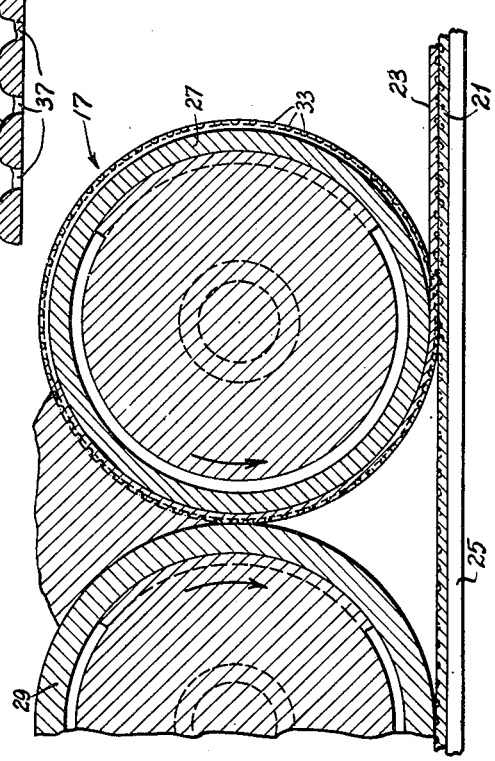
FIG. 3.
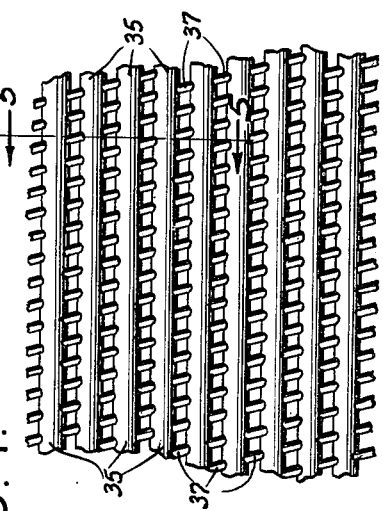
FIG. 4.
FIG. 5.
Douglas Hale,
Ellsworth J. Carpenter,
Inventors,
Haynes and Koenig,
Attorneys.

June 17, 1952 D. HALE ET AL 2,600,532
METHOD FOR MANUFACTURE OF CEREAL FOOD PRODUCTS
Filed July 27, 1949 5 Sheets-Sheet 3

Douglas Hale,
Ellsworth J. Carpenter,
Inventors,
Haynes and Koenig,
Attorneys.

June 17, 1952     D. HALE ET AL     2,600,532
METHOD FOR MANUFACTURE OF CEREAL FOOD PRODUCTS
Filed July 27, 1949     5 Sheets-Sheet 4
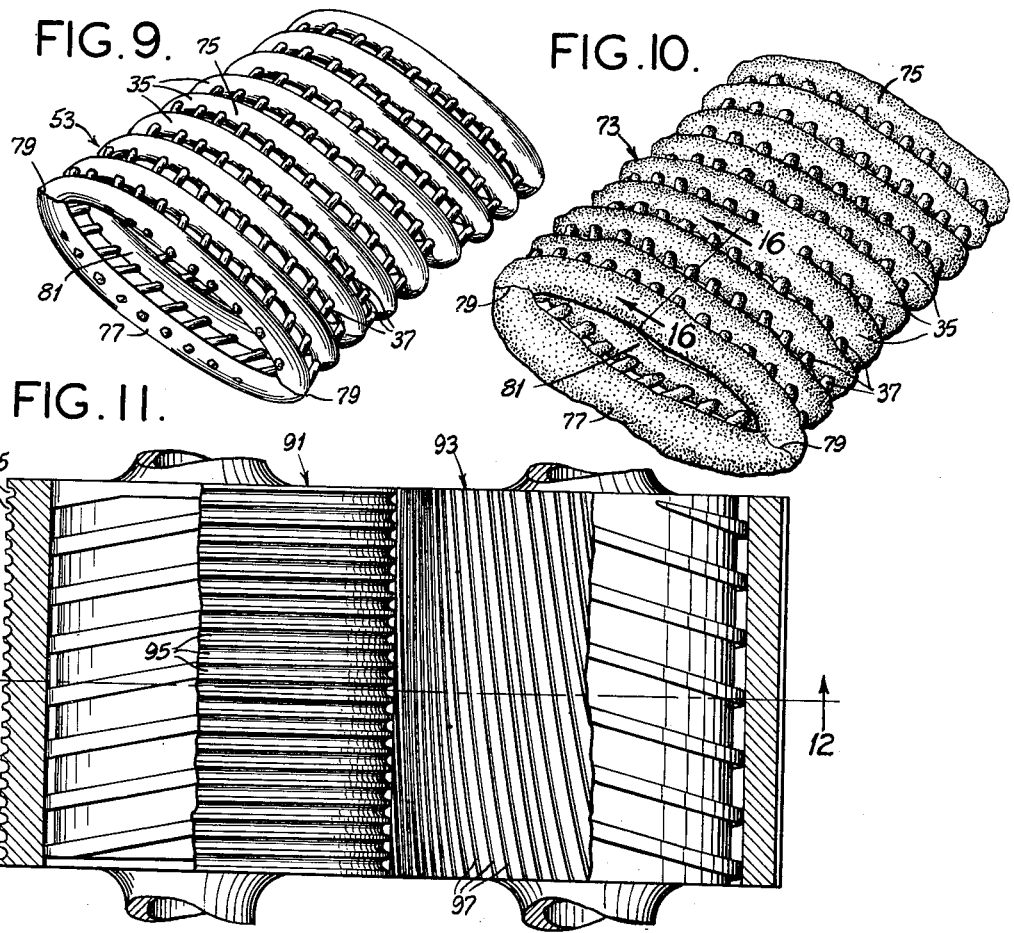
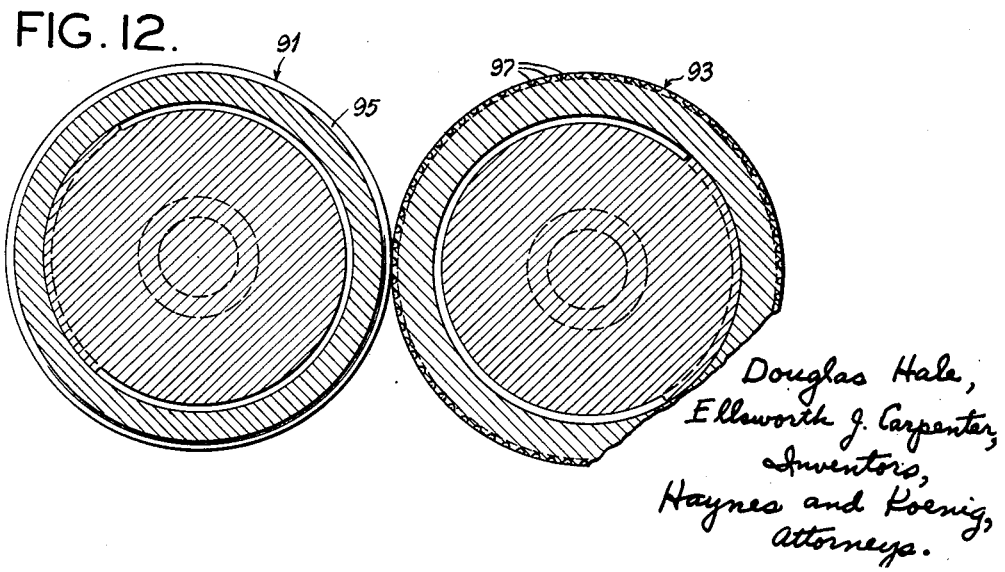

June 17, 1952

D. HALE ET AL 2,600,532

METHOD FOR MANUFACTURE OF CEREAL FOOD PRODUCTS

Filed July 27, 1949

Douglas Hale,
Ellsworth J. Carpenter,
Inventors,
Haynes and Koenig,
Attorneys.

Patented June 17, 1952

2,600,532

UNITED STATES PATENT OFFICE 2,600,532

METHOD FOR MANUFACTURE OF CEREAL FOOD PRODUCTS

Douglas Hale, University City, Mo., and Ellsworth J. Carpenter, Battle Creek, Mich., assignors to Ralston Purina Company, St. Louis, Mo., a corporation of Missouri Application July 27, 1949, Serial No. 107,004

6 Claims. (Cl. 99—81)

This invention relates to cereal food products and their manufacture, and more particularly to improved methods of making biscuit-type cereal food products composed of shredded cereal grain.

The invention generally is concerned with the provision of a biscuit-type cereal food product composed of cooked, puffed and toasted shredded cereal grain wherein the shreds of grain are uniformly and completely puffed, rather than being baked hard in some parts and incompletely puffed in others. In general, this is accomplished by making the product in the form of a hollow biscuit consisting of a hollow empty shell which is composed of a network of shredded cereal grain, thereby having a multiplicity of openings therein. By using such a network, it is possible not only to dry the shreds uniformly but also to have hot puffing air in a puffing oven completely surround all the shreds, thereby to insure uniform, instantaneous and complete puffing. In manufacturing the biscuits according to the invention, cooked shredded cereal grain is formed into a plane network of shreds which have a vermicular form in a certain direction, being substantially spaced from one another in that direction. Then the network is formed into individual hollow bodies corresponding in size to the size of the biscuits to be made, and these hollow bodies are puffed. Other features will be in part apparent and in part pointed out hereinafter.

The invention accordingly comprises the elements and combinations of elements, steps and sequence of steps, features of construction and manipulation, and arrangements of parts which will be exemplified in the structures, and methods hereinafter described, and the scope of the application of which will be indicated in the following claims.

In the accompanying drawings, in which several of various possible embodiments of the invention are illustrated, Fig. 1 is a flow sheet, diagrammatically illustrating an apparatus and process of this invention;

Fig. 2 is a plan view, with parts broken away and shown in section, of a set of shredding and network-forming rolls of the apparatus;

Fig. 3 is a vertical section taken on line 3—3 of Fig. 2;

Fig. 4 is a greatly enlarged fragmentary plan view of a network formed by the rolls of Figs. 2 and 3;

Fig. 5 is a vertical section taken on line 5—5 of Fig. 4;

Fig. 9 is a much enlarged perspective view of an individual biscuit as formed by the roll of Fig. 7, and prior to puffing;

Fig. 10 is a perspective view of the Fig. 9 biscuit after puffing;

Fig. 11 is a view like Fig. 2 (except that it is turned on the page) illustrating a modified form of the shredding and network-forming rolls;

Fig. 12 is a section taken on line 12—12 of Fig. 11;

Corresponding reference characters indicate corresponding parts throughout the several views of the drawings.

The invention is herein described in reference to the production of a rice food product, problems in regard to which it best solves. It will be understood that the basic principles of the invention are applicable to cereal grains other than rice, for example, wheat and corn and oats.

Figure 1:
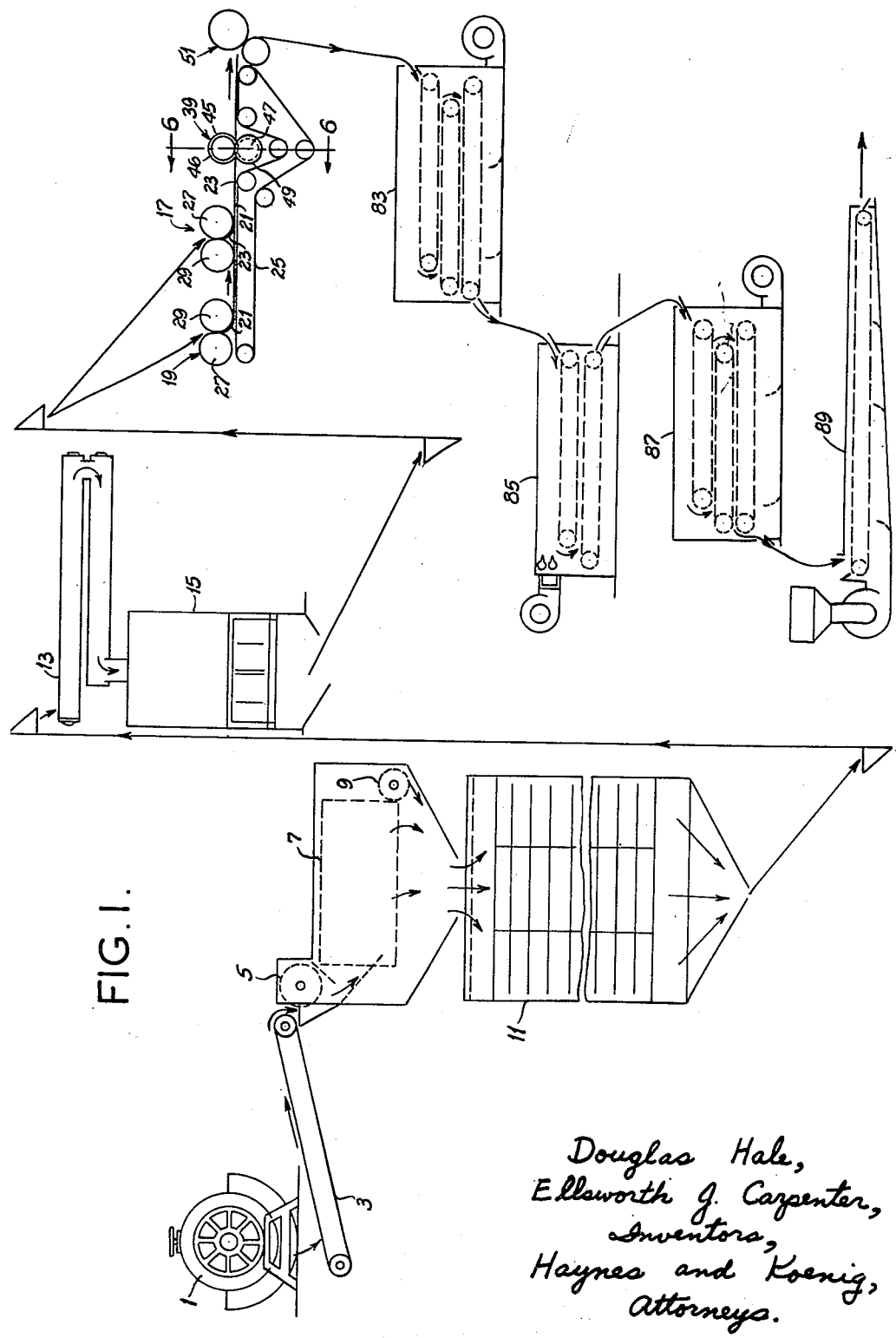

First referring to Fig. 1, in preparing a rice product of this invention, dehulled and degerminized whole-grain rice is cooked with suitable flavoring ingredients in a pressure cooker 1. Flavoring ingredients may be varied depending upon the flavor desired in the finished product. Salt and sugar may be sufficient for the purpose. It may be desirable to use some malted barley extract to help give a light golden color and to bring out the delicate rice flavor. The salt content should be about 2% of the rice used. The sugar content should be from about .3% to 4%. If malted barley is used, it should be about .2% to 3%. This rice is cooked at about 16-20 p. s. i. steam pressure for about 70-120 minutes. The moisture content of the cooked rice runs from about 32% to 36%.

Cooked rice discharged from the pressure cooker 1 is carried by a conveyor 3 to a thresher 5 for separating the individual grains. The grains drop into a drying reel 7 sloping downward to a lump breaker 9 which breaks up any lumps that may form. The grains drop out of the reel and fall by gravity through a drier 11. An upward flow of air is maintained in the drier. Rice from the drier is delivered to and heated in a steamer 13 and then allowed to temper in a tempering bin 15. The tempering equalizes the moisture distribution throughout the rice and toughens the individual grains before shredding. The tempering may not be necessary if after drying its moisture distribution is correct. The rice is preferably dried down to from about 22% to 27% moisture and brought in the steamer to a temperature adapted for best results in shredding, the latter preferably being carried out at from about 130° F. to 150° F.

The cooked and tempered rice grains, having a moisture content from about 22% to 27%, and at a temperature from about 130° F. to 150° F., are shredded in two sets 17 and 19 of shredding and network-forming rolls to form two lattice-like sheet networks 21 and 23 of cooked rice shreds. The networks formed by the rolls are supported and moved forward on an endless collector belt conveyor 25. The set of rolls 19 is located rearward of the set of rolls 17 in relation to the direction of travel of the belt conveyor 25 so that the sheet 21 formed by the set of rolls 17 is deposited flatwise upon the sheet 23 formed by the set of rolls 19, thus bringing the sheets into laminated relationship.

As shown in Figs. 2 and 3, the set of rolls 17 comprises a combination corrugated and cross-cut water-cooled roll 27 peripherally engaging a smooth water-cooled roll 29 and cooperating with the latter to shred the rice and form the network 21 of shreds. The roll 27 is formed with closely spaced annular grooves 31 defining its corrugations and with closely spaced generally transverse cross-cut grooves 33 which are preferably though not necessarily cut on the bias. Rice fed between the rolls 27 and 29 is shredded and formed into a lattice-like network consisting of continuous longitudinal vermicular major shreds 35 and small transverse filament minor shreds 37 (Figs. 4 and 5). The annular grooves 31 are considerably deeper and wider than the cross-cut grooves 33, consequently the longitudinal vermicular major shreds 35 are of considerably greater cross-sectional area than the transverse filament minor shreds 37.

The set of rolls 17 is arranged with the corrugated and cross-cut roll 27 in front and the smooth roll 29 in back in respect to the direction of travel of the networks. The set of rolls 19 is similar to the set of rolls 17 in comprising an identical corrugated and cross-cut roll 27 and an identical smooth roll 29, but in the set of rolls 19 the corrugated and cross-cut roll 27 is in back and the smooth roll 29 in front. The bias of the cross-cut grooves 33 is of value in preventing the rolls from clogging, particularly when the rolls 27 and 29, which are of the same diameter, are driven at somewhat different speeds.

Figure 6:
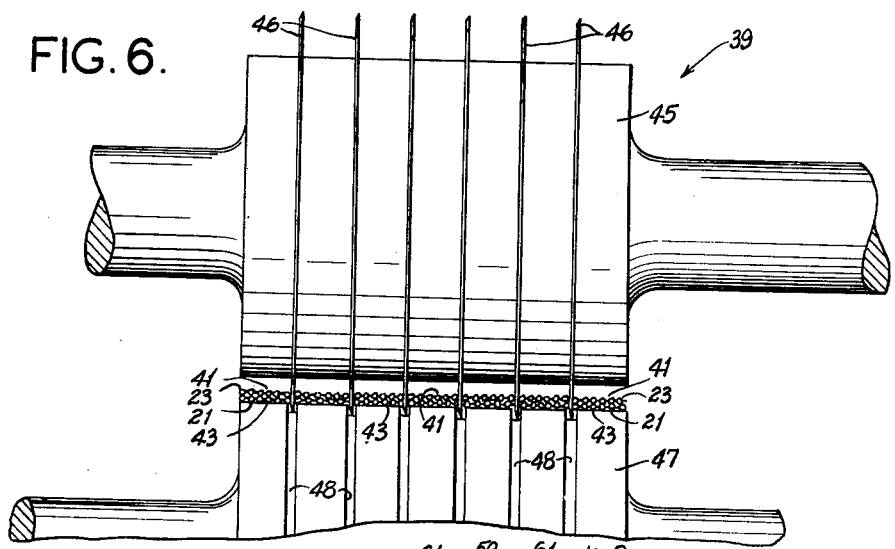
Fig. 6 is an elevation of a slitter of the apparatus, being a section taken on line 6—6 of Fig. 1.

The two lattice-like networks 21 and 23 of cooked shredded rice are carried forward by the belt conveyor 25 through a rotary longitudinal slitter 39 (Figs. 1 and 6) which slits them into ribbons of relatively narrow width (of the order of $\frac{1}{16}$ of an inch, for example). Thus, there issues from the slitter ribbons 41 of the network material 21 superimposed on ribbons 43 of the network material 23. The large vermicular shreds are longitudinal and the fine filaments are lateral with respect to the ribbon lengths. The average diameters of the vermicular shreds are several times those of the filaments. The slitter 39 consists of an upper knife roll 45 having a series of circular cutting blades 46 spaced at axial intervals corresponding to the width of the ribbons to be cut and a lower mating roll 47 having a series of grooves 48 receiving the blades. The conveyor 25 is guided under the lower roll 47 as indicated at 49 in Fig. 1.

Figure 7:
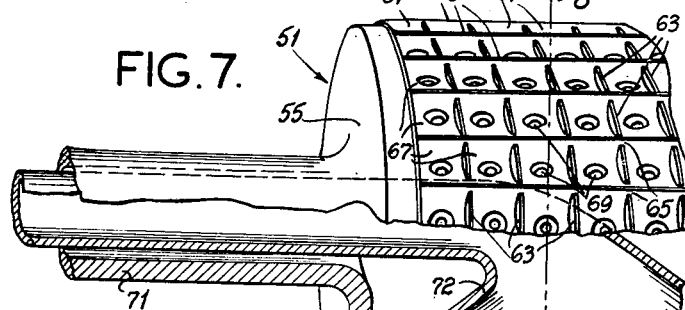
Fig. 7 is a perspective view of a cross-cut biscuit-forming roll of the apparatus, with parts broken away and shown in section.
Figure 8:
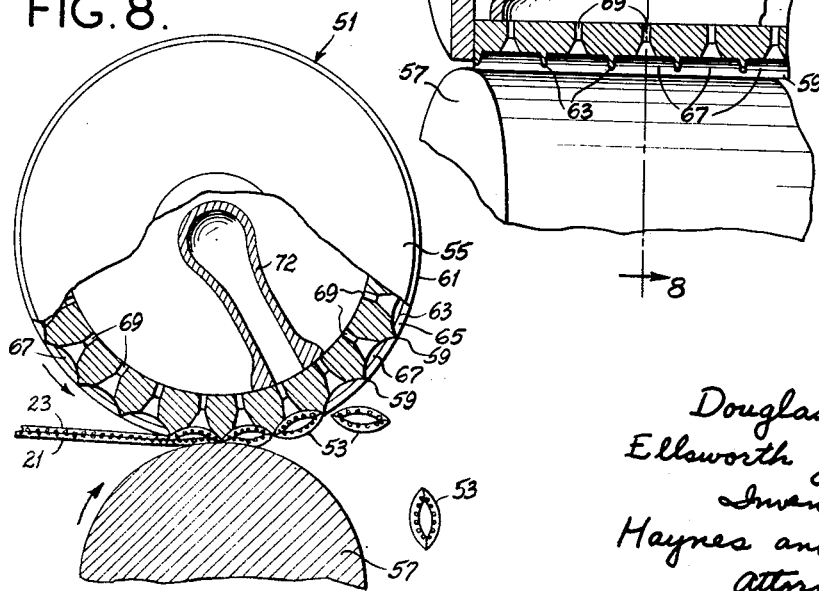
Fig. 8 is a vertical section taken substantially on line 8—8 of Fig. 7.

The conveyor 25 then carries the ribbons from the slitter into the nip of a set of forming rolls 51 (Figs. 1, 7 and 8) which are adapted to convert the ribbons into tube-like bodies or shells 53 such as illustrated in Fig. 9. The set of forming rolls consists of a cross-cut roll 55 and a smooth anvil roll 57. The cross-cut roll is formed on its periphery with axially extending ridges 59. These are spaced around the periphery of the roll at equal intervals corresponding to the width of the biscuits to be formed, and define axial grooves 61 in the periphery of the roll. The cross-cut roll is also formed with peripheral ridges 63 located in radial planes which are axially spaced at intervals corresponding to the width of the ribbons 41 and 43 and consequently corresponding to the length of the biscuits to be formed. These ridges 63 are spaced radially inward of the axial ridges 59 as indicated at 65. The ridges 59 in conjunction with the ridges 63 define shallow pockets 67. Ports 69 extend through the shell of the cross-cut roll 55 from the bottom of each pocket to the interior of the roll. Air under pressure is introduced into the interior of the roll through a hollow trunnion 71 for the roll and is directed by a fixed nozzle 72 to blow out through a row of ports 69 located forward of the nip of the rolls in the direction of their travel to eject formed biscuits from the pockets.

The superimposed ribbons 41 and 43 are fed forward into the nip of the rolls 55 and 57. The axial ridges 59 of the roll 55 press the ribbons together along lines which extend transversely across the ribbons at longitudinally spaced intervals to form the individual hollow, pillow-shaped, open-ended tubular bodies 53 illustrated in Fig. 9, cutting off such bodies at the foremost end of each pair of ribbons 41 and 43. Each of the bodies or shells 53 consists of two rectangular layers 75 and 77 of the network of the cooked shredded rice sealed together along their two lengthwise opposite edges by the action of the axial cross-cut ridges 59 against the anvil roll 57, as indicated at 79. The sealing is between the ends of the vermiculate shreds. The tubular bodies are open at their ends, as indicated at 81, due to the ridges 63 being spaced radially inward from the ridges 59. The diameter of the cross-cut roll 55 is greater than that of the anvil roll 57 and, as it forms the bodies, it bulges out the network material of the upper ribbons 41 into the pockets 67. As the bodies emerge from between the rolls, air from within the cross-cut roll 55 ejects the bodies from the pockets.

The bodies 53 formed by the rolls 55 and 57 are carried through a drying oven 83 (Fig. 1) wherein they are dried to about 8% to 15% moisture content. This takes from about twenty to thirty minutes with a drying temperature from about 180° F. to 250° F.

Then, the dried (8% to 15% moisture) bodies 53 are puffed in a puffing oven 85 (Fig. 1) wherein they are subjected to hot air at a temperature from about 450° F. to 550° F. for from one to two minutes, or until the shreds puff, but not until they start to burn or improperly discolor. The puffing operation lowers the moisture content of the bodies to approximately 3% or 4%. Being in the nature of a hot flash, it also causes the shreds to expand or puff and form the biscuits of the hollow, generally open-ended pillow-shape illustrated in Fig. 10.

Finally, the puffed biscuits 73 are toasted in a toasting oven 87 (Fig. 1) at a temperature from about 250° F. to 275° F. to provide a delicate golden brown toasted color, and, after toasting, are quickly cooled with air at room temperature in a cooler 89 (Fig. 1) so that they may be quickly packed.

Figs. 11 and 12 illustrate a modified form of the shredding and network-forming rolls 17 and 19, wherein each of sets 17 and 19 comprises a corrugated water-cooled roll 91 cooperating with a cross-cut water-cooled roll 93 to shred the rice and form the network of shreds. As shown, the roll 91 is formed with closely spaced annular grooves 95 and the roll 93 is formed with shallower closely spaced generally transverse cross-cut grooves 97 which are preferably though not necessarily cut on the bias. These rolls function to form a network substantially like that formed by the rolls 27 and 29. When they are used, the roll 91 is the back roll in the set 19 and the front roll in the set 17.

Figure 13:
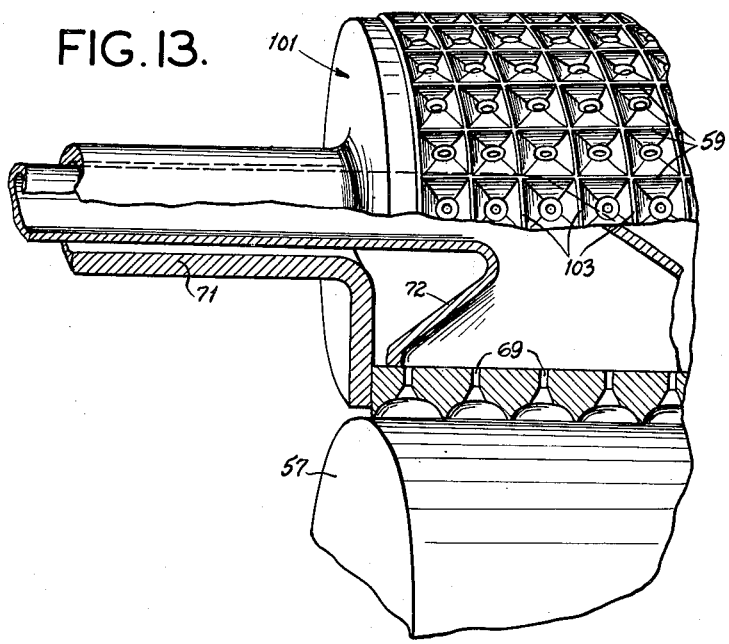
Fig. 13 is a view like Fig. 7 illustrating a modified form of cross-cut biscuit-forming roll, with parts broken away and shown in section.
Figure 14:
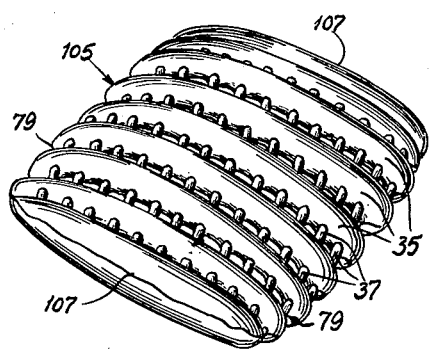
Fig. 14 is a perspective view of the biscuit formed by the Fig. 13 roll, prior to puffing.
Figure 15:
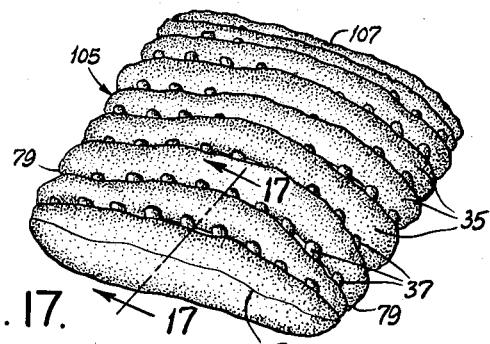
Fig. 15 is a perspective view of the Fig. 14 biscuit after puffing.

Fig. 13 illustrates a cross-cut biscuit-forming roll 101 similar to the roll 55 but modified to form closed-end instead of open-end biscuits. The roll 101 is identical with the roll 55 except that the peripheral ridges 103 of the roll 101 extend to the same outer diameter as the axial ridges 59, instead of being spaced radially inward from the axial ridges as in the roll 55. The roll 101 forms the hollow, pillow-shaped, closed-end tubular bodies 105 illustrated in Fig. 14. These are sealed along their two lengthwise opposite edges as indicated at 79, in the same manner as the bodies 53 of Fig. 9, but, in addition, are sealed at their two ends, as indicated at 107, by the action of the ridges 103. The bodies 105 are dried, puffed, toasted, and cooled, as in the case of the bodies 73, to form the biscuits of the hollow, closed-end generally pillow-shape illustrated in Fig. 15.

The formation of the biscuit from the lattice-like networks of vermicular shreds joined by filaments is most advantageous in that with this formation the superficial surface area of shreds contacted by hot air in the puffing oven is very large in proportion to the volume of the shreds. Thus, all of the shreds are substantially uniformly flash puffed, with a sort of explosive or popping action, which would not occur otherwise. With the network formation, and particularly the formation with the transverse filament shreds 37 considerably smaller than the longitudinal vermicular shreds 35, wherein there is such a high ratio of surface area to volume of the shreds, and with the hollow empty shell formation, the hot puffing air can surround the individual shreds of the network inside and outside and puff them uniformly with substantially no incompletely puffed or merely hard-baked shreds. This is particularly true of the vermiculate shreds.

Figure 16:
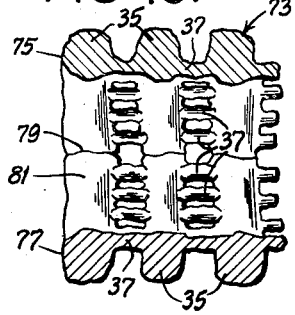
Fig. 16 is an enlarged cross section of the Fig. 10 form of finished biscuit, being taken on line 16—16 of Fig. 10; and, Fig. 17 is an enlarged cross section of the Fig. 15 form of finished biscuit, being taken on line 17—17 of Fig. 15.
Figure 17:
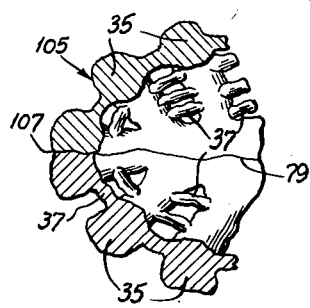

As shown in cross-sectional Figs. 16 and 17, each biscuit consists of a hollow empty shell with the puffed vermiculate major shreds 35 forming a cage the shreds of which are joined laterally only by the small puffed filaments or minor shreds 37. The result is a desirable, delicate hollow product which is sufficiently strong to withstand abrasion without crumbling when packaged, but having a frangibility (due to its hollow form and the delicate filaments) that when chewed it crunches with slight effort.

Cross reference under Rule 78 is made to our divisional application on the apparatus herein disclosed entitled Apparatus for Manufacturing a Cereal Food Product, Serial No. 181,804, filed August 28, 1950.

In view of the above, it will be seen that the several objects of the invention are achieved and other advantageous results attained.

As various changes could be made in the above methods and resulting products without departing from the scope of the invention, it is intended that all matter contained in the above description or shown in the accompanying drawings shall be interpreted as illustrative and not in a limiting sense.

We claim:

1. The method of producing a cereal food product comprising the steps of cooking the cereal to form a moist mass, forming the mass into elongate sheets and perforating the sheets, superimposing one perforated sheet on another, segmenting by pressing the superimposed sheets to form hollow bodies of pillow-like form, each body having one wall which is a segment of one sheet and another wall which is a segment of the other sheet, said walls being perforate throughout and edge-joined, and heat puffing said hollow bodies.

2. The method according to claim 1 wherein the sheets are wider than the desired bodies and the segmenting is preceded by a slitting of the superimposed sheets into ribbons having the width desired for the bodies.

3. The method according to claim 1 wherein the perforating step is accompanied by a shredding step resulting in the formation of each sheet into a lattice-like network of shreds adapted readily to be puffed intersticially during said heat puffing step.

4. The method according to claim 1 wherein the sheets are wider than the desired bodies and the segmenting is preceded by a slitting of the superimposed sheets into ribbons having the width desired for the bodies, and wherein the perforating step is accompanied by a shredding step which imparts a lattice-like form to each sheet having relatively large vermicular shreds extending parallel to the ribbons and relatively small transverse vermicular shreds.

5. The method according to claim 1 wherein the segmenting by pressing joins only two edges of each pillow-like hollow perforated body.

6. The method according to claim 1 wherein the segmenting by pressing joins four edges of each pillow-like hollow perforated body.

DOUGLAS HALE.
ELLSWORTH J. CARPENTER.

REFERENCES CITED

The following references are of record in the file of this patent:

UNITED STATES PATENTS

| Number | Name | Date |
|---|---|---|
| 993,922 | Wallace | May 30, 1911 |
| 1,102,614 | Valentine | July 7, 1914 |
| 1,195,114 | Smith | Aug. 15, 1916 |
| 2,013,003 | Loose | Sept. 3, 1935 |
| 2,338,588 | Kishlar | Jan. 4, 1944 |